United States Patent
Woecht et al.

(10) Patent No.: US 8,844,939 B2
(45) Date of Patent: Sep. 30, 2014

(54) ADAPTER FOR A POWER TOOL

(75) Inventors: Norbert Woecht, Boebingen an der Rems (DE); Johannes Hoeppner, Heubach (DE); Tobias Hokenmaier, Rechberghausen (DE)

(73) Assignee: C. & E. Fein GmbH (DE)

(*) Notice: Subject to any disclaimer, the term of this patent is extended or adjusted under 35 U.S.C. 154(b) by 569 days.

(21) Appl. No.: 12/954,733

(22) Filed: Nov. 26, 2010

(65) Prior Publication Data

US 2011/0127731 A1 Jun. 2, 2011

(30) Foreign Application Priority Data

Nov. 26, 2009 (DE) .......................... 10 2009 057 200

(51) Int. Cl.
  *B23B 31/107* (2006.01)
  *B25F 3/00* (2006.01)
  *B23B 31/02* (2006.01)

(52) U.S. Cl.
  CPC .............. *B25F 3/00* (2013.01); *B23B 2231/04* (2013.01); *B23B 31/107* (2013.01); *B23B 31/026* (2013.01); *Y10S 279/905* (2013.01)
  USPC ................... 279/5; 279/75; 279/79; 279/140; 279/143; 279/905

(58) Field of Classification Search
  CPC ...... B23B 31/026; B23B 31/36; B23B 31/22; B23B 31/1071; B23B 31/103; B23B 31/123; B23B 2231/04; Y01S 279/905
  USPC ............ 279/5, 75, 79, 140, 143, 905, 74, 80, 279/144, 904, 22, 30
  See application file for complete search history.

(56) References Cited

U.S. PATENT DOCUMENTS

| 1,052,077 | A | * | 2/1913 | McMillan | ........................ | 279/79 |
| 3,090,633 | A | * | 5/1963 | Farnsworth | ....................... | 279/5 |

(Continued)

FOREIGN PATENT DOCUMENTS

| DE | 4205259 A1 | 8/1993 |
| DE | 10005910 A1 | 8/2001 |

(Continued)

OTHER PUBLICATIONS

German Search Report; Application No. DE 10 2009 057 200.7; Dec. 12, 2010; 4 pages.

*Primary Examiner* — Eric A Gates
*Assistant Examiner* — Chwen-Wei Su
(74) *Attorney, Agent, or Firm* — St. Onge Steward Johnston & Reens LLC

(57) ABSTRACT

An adapter for a power tool is disclosed which comprises a drive shaft that can be connected to an output shaft of the power tool in a rotationally fixed manner. There is a receiving connector on the power tool. On the adapter there is provided an assigned sleeve that can be pushed onto the receiving connector, and which comprises a clamping ring, which acts together with locking members in order to effect locking of the sleeve on the receiving connector when in a closed position, the clamping ring being held so as to be movable in the axial direction and being preloaded in the direction of the closed position. The locking members act together with the clamping ring in such a way that locking is effected automatically in the closed position when the adapter is pushed onto the power tool as far as the closed position, and a release of the adapter from the closed position can be effected through an axial movement of the clamping ring against its preload.

18 Claims, 4 Drawing Sheets

(56) References Cited

U.S. PATENT DOCUMENTS

| | | | |
|---|---|---|---|
| 4,231,581 A * | 11/1980 | Benedict | 279/19.4 |
| 4,710,079 A * | 12/1987 | Smith et al. | 409/234 |
| 5,709,391 A * | 1/1998 | Arakawa et al. | 279/19.4 |
| 6,047,971 A * | 4/2000 | Harman et al. | 279/143 |
| 6,241,026 B1 * | 6/2001 | Wache et al. | 173/132 |
| 7,497,444 B2 * | 3/2009 | Sakamaki et al. | 279/62 |
| 2001/0017447 A1 | 8/2001 | Baumann et al. | |
| 2001/0050465 A1 * | 12/2001 | Gifford et al. | 279/71 |
| 2003/0042692 A1 * | 3/2003 | Sakamaki et al. | 279/62 |
| 2007/0096404 A1 * | 5/2007 | Frauhammer et al. | 279/19.4 |
| 2007/0120331 A1 | 5/2007 | Manschitz et al. | |
| 2010/0108338 A1 | 5/2010 | Hirt | |

FOREIGN PATENT DOCUMENTS

| | | |
|---|---|---|
| DE | 102004042465 A1 | 3/2006 |
| EP | 1790424 A1 | 5/2007 |
| EP | 1946894 A1 | 7/2008 |
| WO | 2008068100 A1 | 6/2008 |

* cited by examiner

ADAPTER FOR A POWER TOOL

CROSS REFERENCES TO RELATED APPLICATIONS

This application claims priority from German patent application 102009057200.7, filed on Nov. 26, 2009, the entire contents of which is incorporated herein by reference.

BACKGROUND OF THE INVENTION

The invention relates to an adapter for a power tool, preferably an electric power tool, which adapter comprises a drive shaft that can be connected to an output shaft of the power tool in a rotationally fixed manner, comprises a receiving connector that is on the power tool or on the adapter and to which there is assigned a sleeve provided on the respectively other part, and comprises a clamping ring, which acts together with locking arrangement in order to effect locking of the sleeve on the receiving connector when in a closed position.

Such an adapter for a power tool is known from WO 2008/068100 A1.

In the case of the known adapter, an annular spring or a multiplicity of leaf springs is used to fix the adapter on a receiving connector of a power tool. Locking is effected by a clamping ring, which locks in place automatically upon the adapter being pushed onto the power tool, and which must be rotated in order to release it.

The disadvantage of the known arrangement consists in its relatively complicated structure. Moreover, the arrangement is not suitable for single-handed operation. In order to achieve release from the power tool, it is necessary to grip the adapter with one hand, rotate the clamping ring, and hold the power tool with the other hand.

Further known, from EP 1 790 424 A1, is a tool receiver that can be detachably connected to a tool spindle, a guide sleeve being provided, which has openings for a plurality of locking elements that can be engaged in the tool spindle in a radially shiftable manner, and a manually shiftable locking sleeve being provided, which radially locks the locking elements. The locking elements are realized as tilting segments, having an axially fixed-mounted bearing part and having a locking part that can be tilted radially to enter the opening of the guide sleeve.

The locking part in this case serves simultaneously to transfer torque.

Although such a tool receiver is suitable for connecting a drilling head to a tool spindle, it is not suitable for providing a rapidly detachable connection between an adapter and a power tool. In particular, it does not provide for singled-handed operation.

SUMMARY OF THE INVENTION

In view of this, it is a first object of the invention to disclose an adapter for a power tool by means of which a rotationally fixed connection to the power tool can be effected in simple and reliable manner.

It is a second object of the invention to disclose an adapter for a power tool by means of which a simple, single-handed mounting and demounting of the adapter can be effected.

It is a third object of the invention to disclose an adapter for a power tool, which makes it easily visible whether the adapter has been mounted on the power tool correctly.

These and other objects of the invention are achieved, in the case of an adapter of the type stated at the outset, in that the clamping ring is held so as to be movable in the axial direction and is biased in the direction of a locking position or closed position, the locking means acting together with the clamping ring in such a way that locking is effected automatically in the closed position upon the adapter being pushed onto the power tool as far as the locking position, and a release of the adapter from the locking position can be effected through an axial movement of the clamping ring contrary to its bias.

The object of the invention is achieved in this way. This is because, of the invention, a movement of the locking ring in the axial direction provides both for automatic locking upon the adapter being pushed onto the power tool as far as the closed position and, at the same time, for release of the adapter from the closed position through an axial movement of the clamping ring contrary to its preload.

Thus, a single-handed movement enables the adapter, on the one hand, to be locked in a locking position and, on the other hand, to be released again from the locking position and withdrawn. Likewise, it is easily identifiable from the position of the clamping ring whether the adapter has been mounted correctly. This is therefore a considerable improvement as compared with the prior art.

In a preferred development of the invention, the locking means comprise at least one rolling body, preferably a ball, which, in the closed position, can be latched into an assigned cavity.

A particularly simple possibility for locking and unlocking is thus achieved.

Of a further realization of the invention, the clamping ring has a guide surface, which acts together with the at least one rolling body and the cavity in such a way that, through an axial movement of the clamping ring, a radial movement of the rolling body can be effected for the purpose of locking in the cavity under the action of the preload and, through a movement of the clamping ring contrary to its preload, unlocking out of the closed position can be effected.

This measure provides for a simple and advantageous possibility for locking and unlocking.

Of a further embodiment of the invention, the locking means comprise centering means, for fixing the adapter without play on the power tool when in the closed position.

This enables the adapter to be fixed without play on the power tool without use of additional measures.

In addition, the centering means can be realized in the form of inclined surfaces on the cavity and on the clamping ring, which surfaces act together with the at least one rolling body.

A simple possibility for locking and unlocking can thus be combined with centering.

Of a further feature of the invention, the cavity is realized as an annular groove on the receiving connector.

An automatic locking on the annular groove can thus be achieved in a particularly simple manner by means of the axially movable clamping ring, upon axial displacement as far as the closed position.

Of a further feature of the invention, there are provided on the power tool and on the adapter mutually assigned engagement means that allow the adapter to be fixed in differing angular positions on the power tool.

Preferably, for this purpose, the engagement means comprise projections or cavities on a collar of the receiving connector, and comprise assigned cavities or projections on the sleeve.

The adapter can thus be fixed in differing angular positions on the power tool, without special accessories being required for this purpose.

Of a further feature of the invention, at least one spring element is provided on the sleeve, for the purpose of securing the clamping ring in an open position.

In an additional development of this embodiment, the spring element automatically releases the clamping ring upon the sleeve being pushed onto the receiving connector.

These measures provide for simple handling of the clamping ring. In particular, automatic release of the clamping ring can be effected upon the sleeve being pushed onto the receiving connector, such that automatic locking is then made possible. Single-handed operation can thus be realized in a simple manner.

Of a further feature of the invention, the spring element has a first tongue that protrudes over an inner surface of the sleeve.

This measure enables automatic release of the sleeve to be realized in a simple manner as a result of the sleeve contacting the receiving connector upon the sleeve being pushed onto the receiving connector.

Of a further embodiment of the invention, the spring element is configured as a leaf spring, which is pivotally mounted on the sleeve.

Although, in principle, other embodiments of the spring element are also conceivable, e.g. as a helical spring, the spring element can thus be integrated on the sleeve and, by means of the overlapping clamping ring, secured against falling out, in a particularly simple manner.

Preferably, an opening is provided on the inner surface of the sleeve, through which opening the tongue of the spring element protrudes over the inner surface of the sleeve.

Of a further embodiment of the invention, in the open position the spring element protrudes over an outer contour of the sleeve and secures the clamping ring by bearing on the spring element in the open position.

These measures enable simple securing of the clamping ring against random or automatic displacement to be combined with a simple possibility for unlocking.

Preferably, the clamping ring is fixed on the sleeve by means of a pressure spring in such a way that it preloads the clamping ring, upon release of the spring element, by pushing the sleeve onto the receiving connector, in the direction of the closed position.

It is thus possible to achieve, for single-handed operation, both release of the spring element, upon the sleeve being pushed onto the receiving connector, and locking of the sleeve with the receiving connector, when the closed position is attained.

Of a further embodiment of the invention, there is provided on the receiving connector a collar that acts together with the push-on sleeve for the purpose of centering the adapter.

A possibility for centering between the sleeve and the collar is thus created.

In an alternative embodiment of the invention, the mutually assigned engagement means are realized for centering the adapter.

It is thus possible to achieve shortening of the structural length, since the engagement means that are present in any case are used for centering. In this case, the sleeve itself can be realized in a shortened manner.

The object of the invention is further achieved by a power tool having an adapter of any one of the preceding claims.

It is understood that the features stated above and those yet to be explained in the following are applicable, not only in the respectively specified combination, but also in other combinations or singly, without departure from the scope of the present invention.

BRIEF DESCRIPTION OF THE DRAWINGS

Further features and advantages of the invention are given by the following description of preferred exemplary embodiments with reference to the drawing, wherein.

DETAILED DESCRIPTION OF THE PREFERRED EMBODIMENTS

Figure 1:
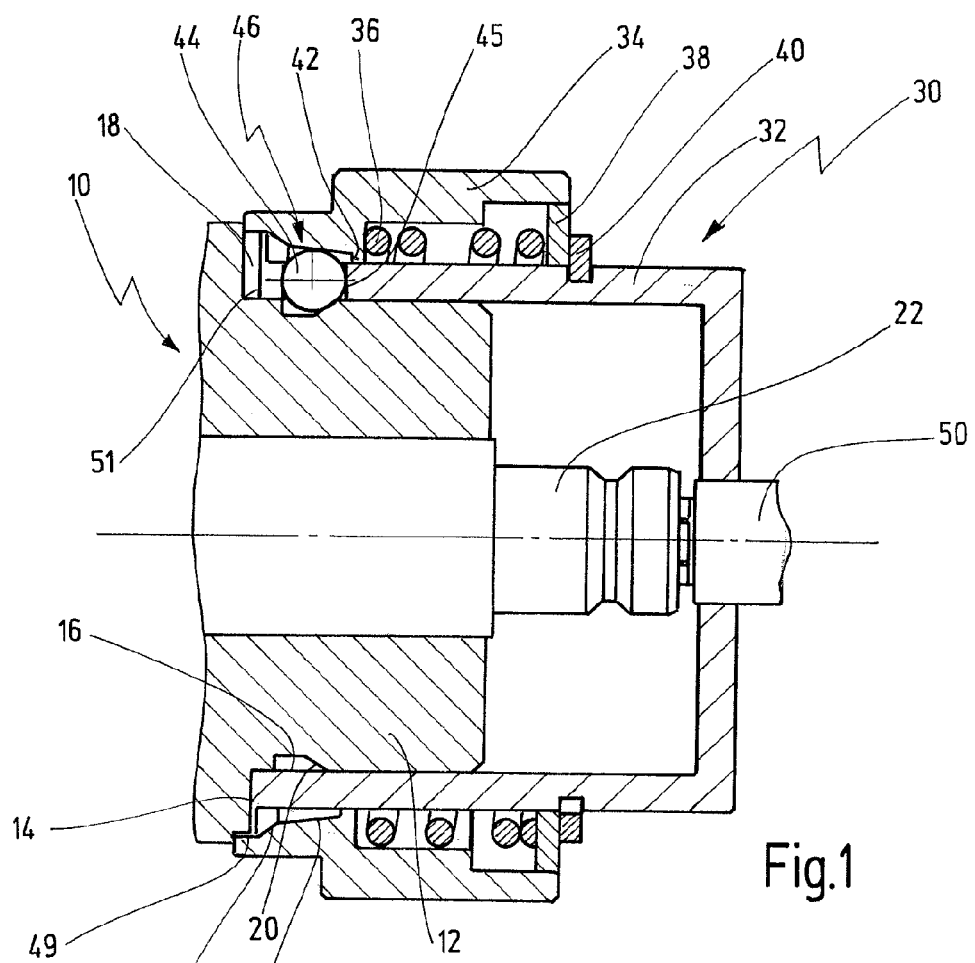
FIG. 1 shows a partial section through the front region of a power tool with an adapter, placed thereon, which is locked in a closed position on the power tool.

FIG. 1 shows an enlarged representation of a power tool 10 in the region of its outer end, together with an adapter 30 placed thereon.

The power tool 10 can be any power tool, preferably a hand-held power tool in the form of an electric tool, for example a screwdriver, a power drill or the like.

The adapter 30 can be any accessory part such as, for instance, an eccentric adapter, an angle head or other adapter. Common to all adapters 30, however, is that the adapter 30 has a drive shaft 50, which can be coupled to an output shaft 22 of the power tool 10 in a rotationally fixed manner, the connection preferably being a form-fit connection. For reasons of clarity, the figures show only those parts of the adapter 30, apart from the drive shaft 50, that are necessary for connection to the power tool 10. Other functional parts of the adapter, which are known in principle and do not constitute part of the invention, such as, for example, a bevel gear system or the like, are not represented.

Figure 2:
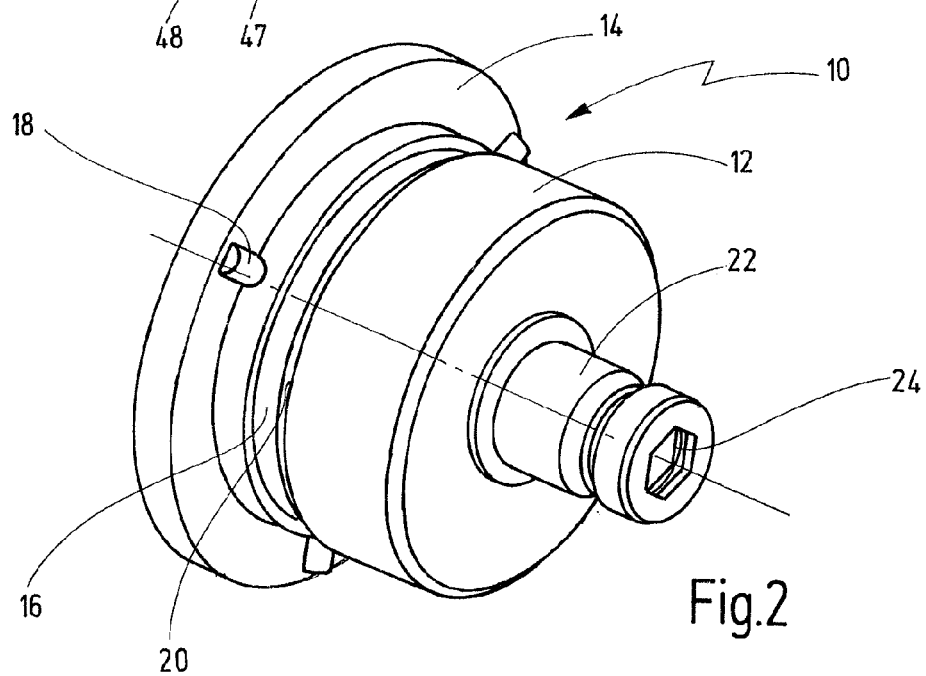
FIG. 2 shows a representation of the output shaft of the power tool, in a perspective view.

The shape of the power tool 10 in the region of the output shaft 22 can be seen in greater detail in FIG. 2.

Figure 3:
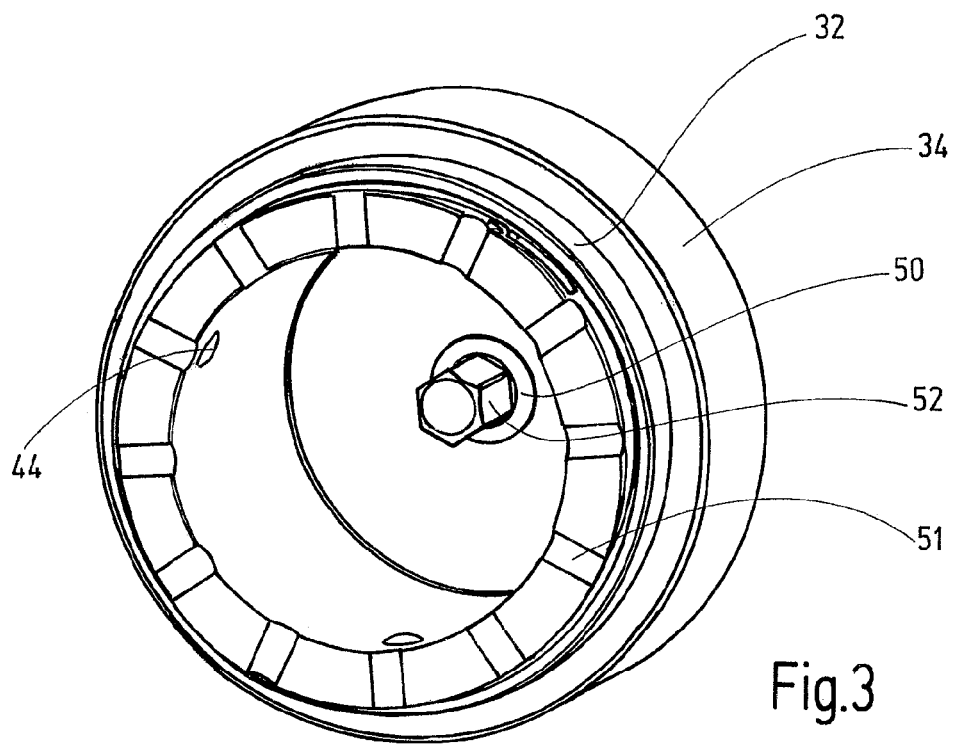
FIG. 3 shows a perspective view of the adapter, as viewed from the power tool side.

The power tool 10 has a cylindrical output shaft 22 having a form-fit element 24 in the form of a hexagonal cavity. A basically cylindrical receiving connector 12, which is widened on the power tool side by a collar 14, is provided to connect the power tool 10 to the adapter 30. Further, on the surface of the collar 14 that projects radially from the receiving connector 12, a plurality of engagement elements 18 are provided in the form of semi-cylindrical webs, which are arranged at uniform angular intervals in relation to each other. In the present case, three webs are arranged on the collar 14, at angular intervals of 120° in relation to each other. Corresponding engagement means 51, in the form of correspondingly shaped cavities on the adapter 30, are assigned to these webs, as a result of which the adapter 30 can be fixed in its angular position relative to the power tool 10 (cf. FIG. 3). Since a total of twelve such engagement means 51, in the form of cavities, are provided at uniform angular intervals from one another on the adapter 30, the adapter 30 can be mounted in any angular positions relative to the power tool 10, the relative position being variable by intervals of 30° in each case.

Further provided on the receiving connector 12 is a cavity 16 in the form of a circumferential annular groove, which is realized to receive a locking means, in the present case in the form of a rolling body, namely, a ball.

The adapter 30 has a cup-shaped sleeve 32, which can be pushed onto the receiving connector 12 and, in a closed position, can be securely fixed on the power tool 10 by means of a spring-loaded clamping ring 34 and by locking means, denoted generally by 16, 44. The previously mentioned cavities 51, which are assigned to the webs 18 on the collar 14 of the receiving connector 12, are configured on the front end of the sleeve 32, which likewise is widened radially outwards to some extent by a collar. In the closed position of FIG. 1, the cavities 51 of the sleeve 32 thus lie on the three assigned webs 18 on the collar 14, such that the centering can also be achieved thereby at the same time, insofar as this is not already effected by the end face of the sleeve 32 bearing on the collar 14.

Figure 4:
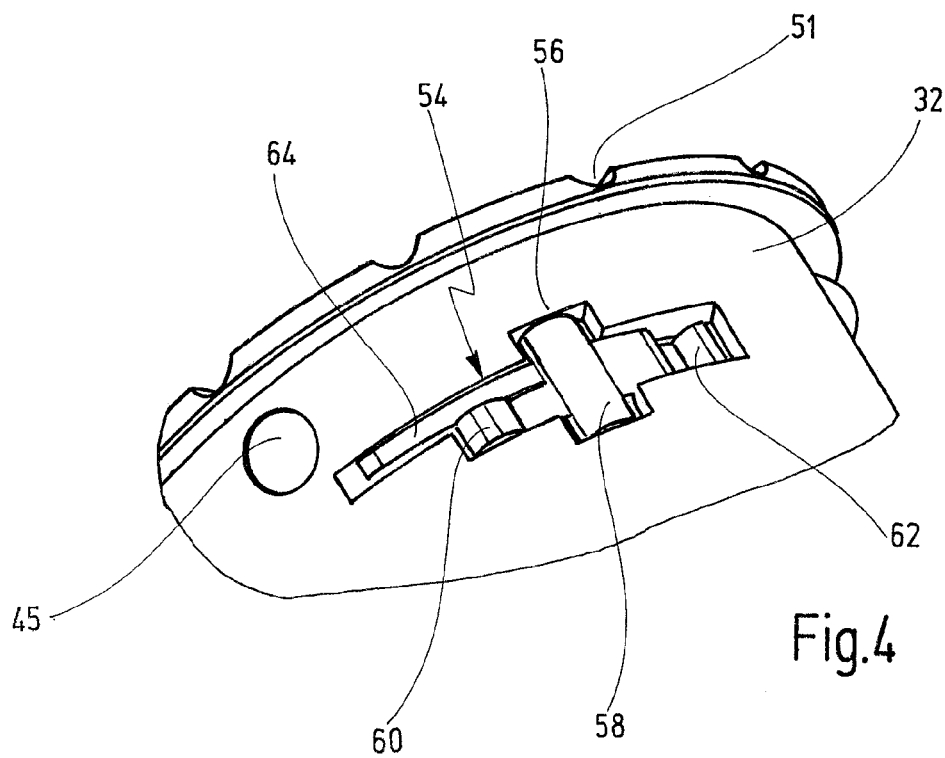
FIG. 4 shows an enlarged partial view of the sleeve of the adapter after removal of the clamping ring, the view showing a tension spring, and a cavity for receiving a rolling element.
Figure 5:
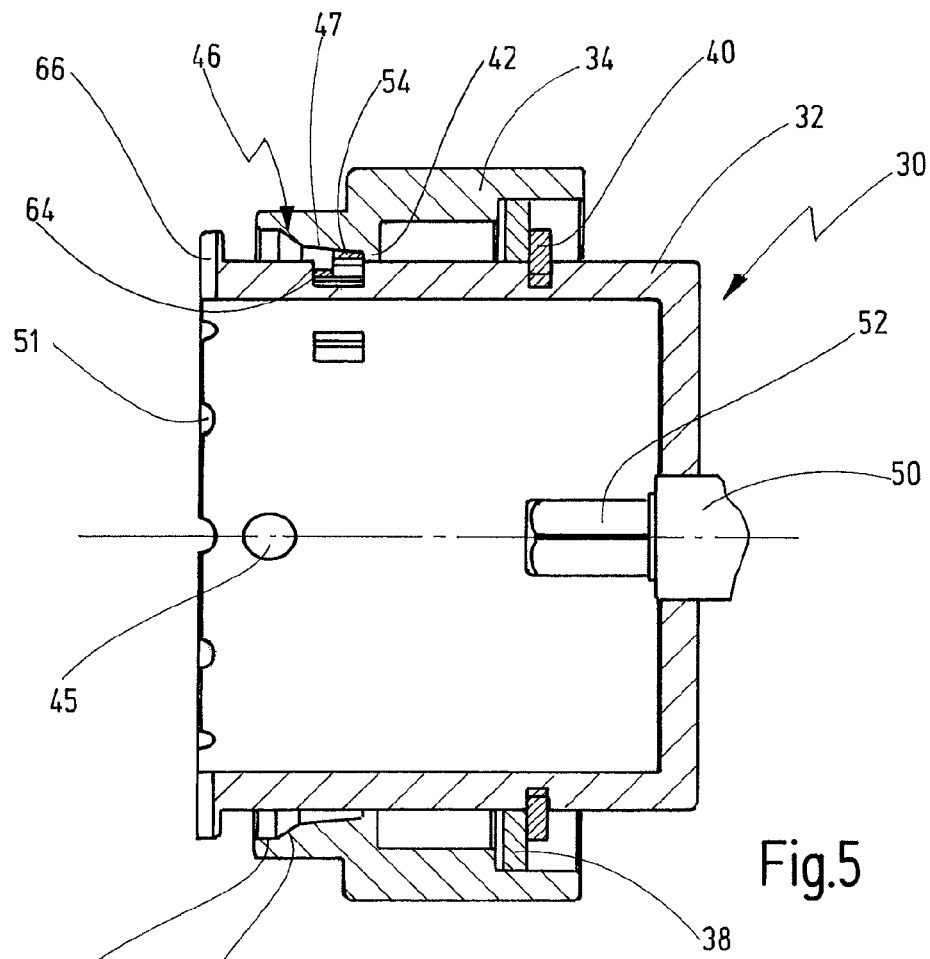
FIG. 5 shows a longitudinal section through the adapter of FIG. 3, in which neither the spring for preloading the clamping ring in the clamping position nor the rolling body are represented.

The clamping ring 34 is fixed so as to be axially movable on the sleeve 32 of the adapter 30, and is preloaded in the direction of the power tool 10 by a pressure spring in the form of a helical spring 36. The pressure spring 36 is accommodated in a recess of the clamping ring 34 and delimited towards the outside (i.e. towards the side facing away from the power tool 10) by a washer 38, which is fixed by means of a retaining ring 40 on the sleeve 32. Towards the inside, the pressure spring 36 bears on an inner collar 42 of the clamping ring 34, such that a preload towards the inside, i.e. in the direction of the power tool 10, is produced. A movement of the clamping ring 34 in the direction of the power tool 10 is limited by the rolling body 44 in the form of a ball, which is held by a guide surface 46 on the clamping ring 34 so as to be radially movable in a recess 45 in the wall surface of the sleeve 32. The rolling body 44 is prevented from falling out towards the inside by a somewhat reduced diameter of the recess 45. The rolling body 44 is prevented from falling out towards the outside by the overlapping clamping ring 34 and the bearing contact of the assigned guide surface 46. In addition, between the clamping ring 34 and the sleeve 32, a spring element 54 is provided in a correspondingly shaped recess or cavity 56 of the sleeve 32. The spring element 54, whose shape can be seen in greater detail in FIG. 4, is realized as a leaf spring, having a central part 58, from which a first limb 60 projects towards one side and a second limb 62 projects towards the opposite side. Parallel to the first and the second limb 60, 62, a third limb 64, which serves to fix the spring element 54 in the assigned cavity 56 of the sleeve 32, acts on the central part 58. The spring element 54 can pivot, with the first limb 60 and the second limb 62, about its central part 58, such that a respectively assigned tongue at the outer end, namely, a first tongue 70 on the first limb 60 and a second tongue 72 on the second limb 62, each protrude, respectively, outwards and inwards over the contour of the sleeve 32 (FIGS. 6, 7).

Figure 6:
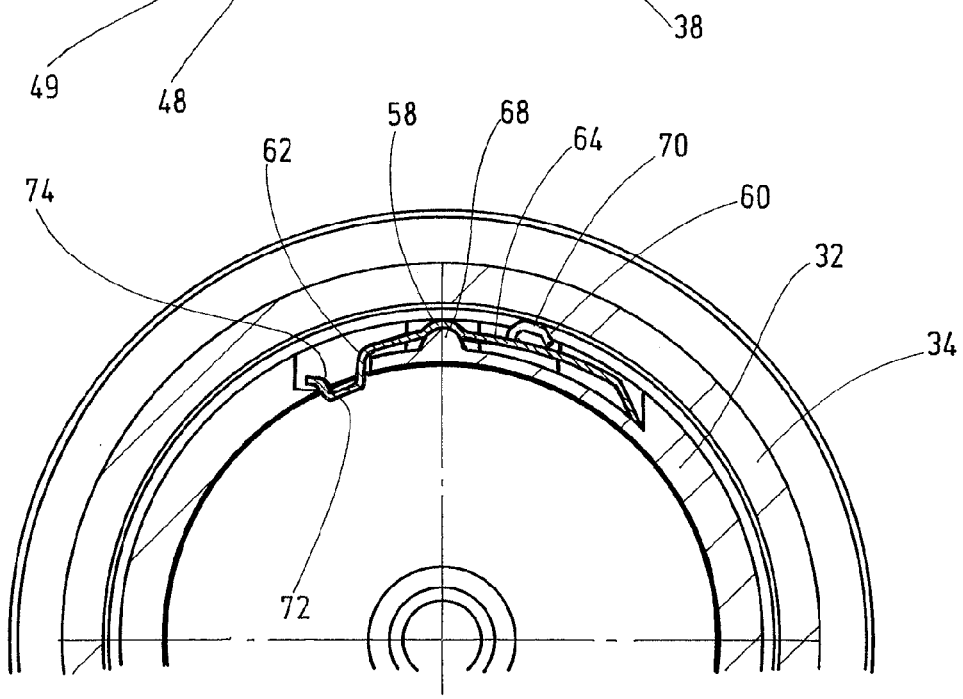
FIG. 6 shows an enlarged cross-section through the adapter in the region of the tension spring, as viewed from the power tool side.
Figure 7:
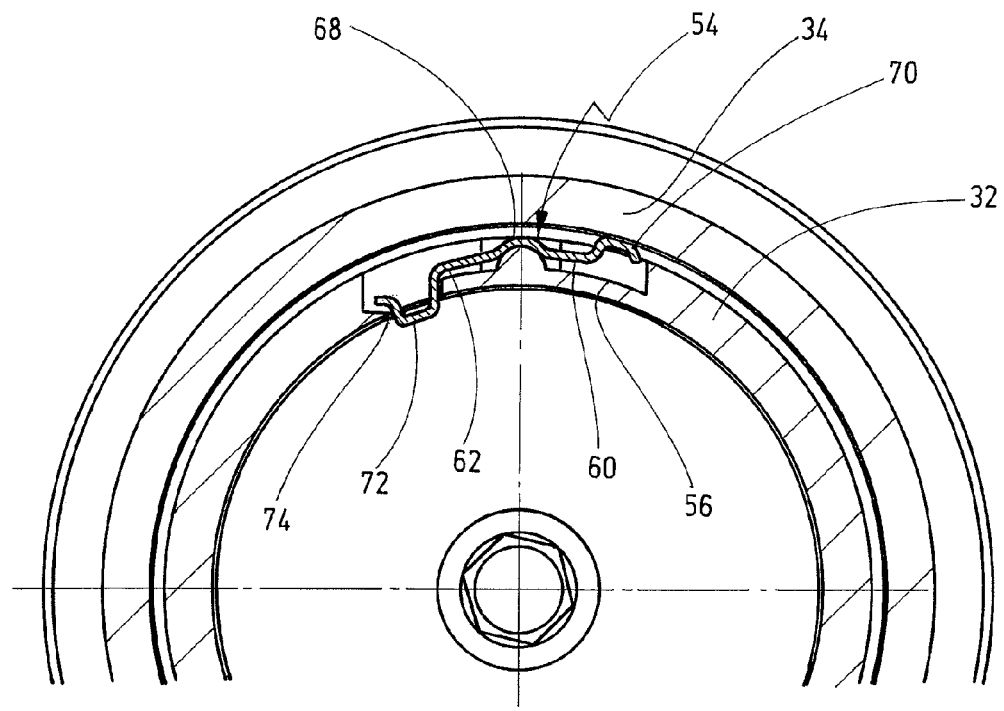
FIG. 7 shows a cross-section through the adapter in the region of the tension spring, as viewed from the side facing away from the power tool, wherein both mutually opposing tongues can be seen, in the locked position, without the adapter having been placed on the power tool.

It can be seen in FIG. 6 how the second tongue 72 protrudes out through an opening 74 in the inner surface of the sleeve 32. In this position, the first tongue 70 at the same time protrudes outwards over the outer contour of the sleeve 32, such that the collar 42, on which the pressure spring 36 bears, is blocked by the spring element 54. Consequently, the clamping ring 34 is arrested in this position by the spring element 54, which is in its non-tensioned position. This position is also represented in FIG. 7, wherein, however, the section goes directly through the first and the second limb 60, 62.

If the adapter 30 is now pushed, with its sleeve 32, onto the receiving connector 12, the second tongue 72 of the spring element 54 is automatically pressed outwards through the opening 74, such that the first tongue 70 releases the collar 42 of the clamping ring 34, such that the clamping ring 34 can move, under the action of the pressure spring 36, further in the direction of the collar 14 on the receiving connector 12. This movement causes the rolling body 44 to be acted upon in the radially inward direction by the correspondingly shaped guide surface 46 on the inside surface of the clamping ring 34. The guide surface 46 has a first portion in the form of a first inclined surface 47 having a small inclination (less than 10°) relative to the axial direction, which portion is adjoined by a second inclined surface 48 having a greater inclination (approximately 30°-40°), and finally by a third portion in the form of a hollow-cylinder surface 49.

Figure 8:
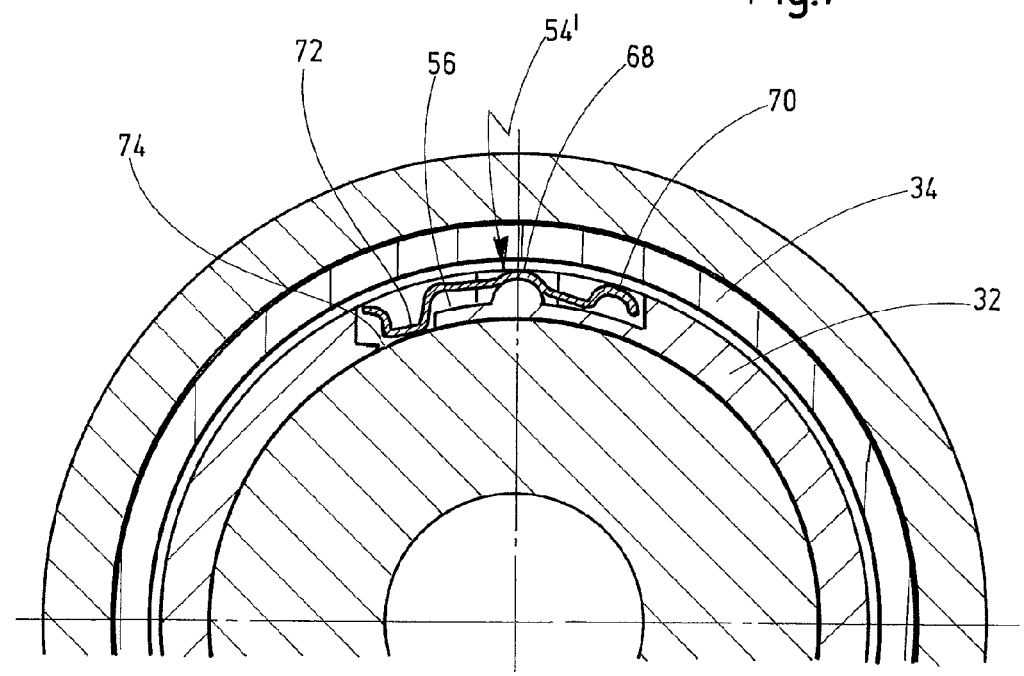
FIG. 8 shows a section through the adapter of FIG. 7, but after it has been placed on the power tool, with a tension spring, which is tensioned.

If the adapter 30 is now placed, with its sleeve 32, onto the receiving connector 12 in such a way that the form-fit counter element 52 on the drive shaft 50 engages in the form-fit element 24 of the output shaft 22, and is then pushed onto the receiving connector 12 to such an extent that the spring element 54 becomes unlocked (cf. FIG. 8), the rolling body 44 is acted upon radially in the direction of the opening 45 by the first inclined surface 47 of the clamping ring 34. Upon reaching the end position, the rolling body 44 then goes into the position represented in FIG. 1, such that the rolling body 44 latches-in on the annular cavity of the receiving connector 12. In this position, the clamping ring 34 almost closes with the collar 14 on the receiving connector 12, such that, even visually, it is easily apparent that locking of the adapter 30 to the power tool 10 has been achieved. In this position, the rolling body 44 is held without play by, on the one hand, the inclined surface 47 on the clamping ring 34 and, on the other hand, by a further assigned inclined surface 20 on the annular cavity 16 of the receiving connector 12.

It is understood that, instead of only a single rolling body 44 and only a single tension spring 54, a plurality of rolling bodies 44 and a plurality of tension springs 54 can be provided, in order, for instance, to counter canting.

If the adapter 30 is to be released again from the power tool 10, it is necessary only for the clamping ring 34 to be drawn outwards, against the action of the pressure spring 36. The rolling body 44 is thereby released, such that the latter comes out of the annular groove 16, into the region of the second inclined surface 48 of the clamping ring 34, and is held between the second inclined surface 48, the cylindrical surface 49 and the outer surface of the receiving connector 12. The spring element 54 in this case goes back to its non-tensioned position, in which the clamping ring 34 is locked by the tongue 70 of the spring element 54 (cf. FIGS. 6, 7).

With the adapter 30 of the invention, particularly simple fastening of the adapter 30 on the power tool 10 is achieved. For this purpose, it is necessary only for the adapter 30 to be placed, with its form-fit counter element 52, on the form-fit element 24 of the output shaft 22 and then to be pushed, with its sleeve 32, onto the receiving connector 12 until the clamping ring 34 is released and, after being pushed on as far as the end position, in which the cavities 51 come to bear on the webs 18, is locked automatically by latching of the rolling body 44 in the annular groove 16.

What is claimed is:

1. A power tool comprising an output shaft that can be driven rotatingly, and an adapter, wherein said adapter comprises:
   a receiving connector provided on a first part selected from the group consisting of the power tool and the adapter;
   a sleeve provided on a second part selected from said group, said sleeve being configured so as to allow sliding of said sleeve on said receiving connector into a locking position, wherein said sleeve is locked on said connector;

a clamping ring being arranged on said sleeve movable in an axial direction thereof, said clamping ring having a locking position being associated with said locking position of said sleeve and having a released position allowing movement of said sleeve together with said clamping ring towards said locking position;

a locking arrangement cooperating with said clamping ring and said receiving connector in order to effect locking of said sleeve on said receiving connector when being in said locking position; and at least one spring element arranged pivotably on said sleeve for securing said clamping ring in said released position, said spring element, when being in said released position, protrudes beyond a contour of said sleeve thereby securing said clamping ring in said released position, said spring element, when being in said locking position, is disposed within the contour of said sleeve;

wherein said clamping ring is biased into said locking position, and wherein said locking arrangement cooperates with said clamping ring and said sleeve so that said locking arrangement locks said clamping ring on said receiving connector, upon sliding said sleeve on said receiving connector axially until said locking position is reached; and wherein said clamping ring can be released from said locking position by moving said clamping ring axially against said bias.

2. An adapter for a power tool comprising:

a drive shaft being configured for engaging an output shaft of the power tool in a rotationally fixed manner;

a receiving connector provided on a first part selected from the group consisting of the power tool and the adapter;

a sleeve provided on a second part selected from said group, said sleeve being configured so as to allow sliding of said sleeve on said receiving connector into a locking position, wherein said sleeve is locked on said connector;

a clamping ring being arranged on said sleeve movable in an axial direction thereof, said clamping ring having a locking position being associated with said locking position of said sleeve and having a released position allowing movement of said sleeve together with said clamping ring towards said locking position;

a locking arrangement comprises at least one rolling body cooperating with an associated cavity on said receiving connector in order to effect locking of said sleeve on said receiving connector when being in said locking position;

at least one spring element arranged pivotably on said sleeve for securing said clamping ring in said released position, said spring element, when being in said released position, protrudes beyond a contour of said sleeve thereby securing said clamping ring in said released position, said spring element, when being in said locking position, is disposed within the contour of said sleeve;

wherein said clamping ring is biased into said locking position, and wherein said locking arrangement cooperates with said clamping ring and said sleeve so that said locking arrangement locks said sleeve on said receiving connector, upon sliding said sleeve on said receiving connector axially until said locking position is reached; and wherein said sleeve can be released from said locking position by moving said clamping ring axially against said bias.

3. The adapter of claim 2, wherein said clamping ring has a guide surface, which cooperates with at least one rolling body and said cavity so that, upon axial movement of said clamping ring under said bias, a radial movement of said rolling body is effected for engaging said cavity, thereby locking said sleeve in said locking position, and so that, upon movement of said clamping ring against said bias, said at least one rolling body disengages from said cavity, thereby unlocking said sleeve.

4. An adapter for a power tool comprising:

a drive shaft being configured for engaging an output shaft of the power tool in a rotationally fixed manner;

a receiving connector provided on a first part selected from the group consisting of the power tool and the adapter;

a sleeve provided on a second part selected from said group, said sleeve being configured so as to allow sliding of said sleeve on said receiving connector into a locking position, wherein said sleeve is locked on said connector;

a clamping ring being arranged on said sleeve movable in an axial direction thereof, said clamping ring having a locking position being associated with said locking position of said sleeve and having a released position allowing movement of said sleeve together with said clamping ring towards said locking position;

a locking arrangement cooperating with said clamping ring and said receiving connector in order to effect locking of said sleeve on said receiving connector when being in said locking position;

at least one spring element arranged pivotably on said sleeve for securing said clamping ring in said released position, said spring element, when being in said released position, protrudes beyond a contour of said sleeve thereby securing said clamping ring in said released position, said spring element, when being in said locking position, is disposed within the contour of said sleeve;

wherein said clamping ring is biased into said locking position, and wherein said locking arrangement cooperates with said clamping ring and said sleeve so that said locking arrangement locks said sleeve on said receiving connector, upon sliding said sleeve on said receiving connector axially until said locking position is reached; and wherein said sleeve can be released from said locking position by moving said clamping ring axially against said bias.

5. The adapter of claim 4, wherein said locking arrangement comprises at least one rolling body, which engages an associated cavity on said receiving connector when being in said locking position.

6. The adapter of claim 5, wherein said clamping ring has a guide surface, which cooperates with at least one rolling body and said cavity so that, upon axial movement of said clamping ring under said bias, a radial movement of said rolling body is effected for engaging said cavity, thereby locking said sleeve in said locking position, and so that, upon movement of said clamping ring against said bias, said at least one rolling body disengages from said cavity, thereby unlocking said sleeve.

7. The adapter of claim 5, wherein said cavity and said clamping ring both comprise inclined surfaces cooperating with said at least one rolling body, thereby holding said adapter without play on said power tool when being in said locked position.

8. The adapter of claim 5, wherein said cavity is configured as an annular groove provided on said receiving connector.

9. The adapter of claim 4, wherein said locking arrangement comprises centering means for holding said adapter without play on said power tool when being in said locked position.

10. The adapter of claim 4, further comprising engagement means provided between said power tool and said adapter, said engagement means allowing to fix said adapter on said power tool in different angular positions.

11. The adapter of claim 10, wherein said engagement means comprise at least one projection and an associated cavity for engaging said projection, wherein one of said projection and said cavity is provided on said sleeve and another one of said projection and said cavity is provided on said receiving connector.

12. The adapter of claim 10, wherein said engagement means are configured for centering said adapter on said power tool.

13. The adapter of claim 4, wherein said spring element releases said clamping ring from upon pushing said sleeve onto said receiving connector.

14. The adapter of claim 4, wherein said spring element comprises a first tongue that protrudes over an inner surface of said sleeve.

15. The adapter of claim 14, further comprising an opening provided on said inner surface of said sleeve, through which said first tongue protrudes beyond said inner surface of said sleeve.

16. The adapter of claim 4, wherein said spring element is configured as a leaf spring, which is mounted on said sleeve pivotably.

17. The adapter of claim 4, further comprising a pressure spring for biasing said clamping ring into said locked position.

18. The adapter of claim 4, wherein said receiving connector comprises a collar that cooperates said sleeve for centering the adapter on said receiving connector.

* * * * *